United States Patent [19]
Cohn et al.

[11] Patent Number: 5,887,554
[45] Date of Patent: Mar. 30, 1999

[54] RAPID RESPONSE PLASMA FUEL CONVERTER SYSTEMS

[76] Inventors: Daniel R. Cohn, 26 Walnut Hill Rd., Chestnuthill, Mass. 02167; Alexander Rabinovich, 1000 Loring Ave. Apt. C50, Salem, Mass. 01970; Charles H. Titus, 323 Echo Valley La., Newtown Sq., Pa. 19073

[21] Appl. No.: 589,118

[22] Filed: Jan. 19, 1996

[51] Int. Cl.⁶ .................................................... F02B 43/10
[52] U.S. Cl. ...................................... 123/3; 123/DIG. 12
[58] Field of Search ................................ 123/3, DIG. 12

[56] References Cited

U.S. PATENT DOCUMENTS

| | | |
|---|---|---|
| 3,594,609 | 7/1971 | Vas et al. . |
| 3,622,493 | 11/1971 | Crusco et al. . |
| 4,036,181 | 7/1977 | Matovich . |
| 4,099,489 | 7/1978 | Bradley . |
| 4,144,444 | 3/1979 | Dementiev et al. . |
| 4,458,634 | 7/1984 | Carr et al. . |
| 4,469,932 | 9/1984 | Spiegelberg et al. . |
| 4,625,681 | 12/1986 | Sutekiyo . |
| 4,841,925 | 6/1989 | Ward . |
| 5,143,025 | 9/1992 | Munday . |
| 5,159,900 | 11/1992 | Dammann . |
| 5,207,185 | 5/1993 | Greiner et al. . |
| 5,409,784 | 4/1995 | Bromberg et al. . |
| 5,425,332 | 6/1995 | Rabinovich et al. . |
| 5,437,250 | 8/1995 | Rabinovich et al. . |

FOREIGN PATENT DOCUMENTS

| | | |
|---|---|---|
| 0 153 116 | 8/1985 | European Pat. Off. . |
| 2 593 493 | 7/1987 | France . |
| 2 620 436 | 3/1989 | France . |
| 30 48 540 A1 | 7/1982 | Germany . |
| 237 120 A1 | 7/1986 | Germany . |
| 51 27630 | 8/1976 | Japan . |
| 2 121300 | 5/1990 | Japan . |

(List continued on next page.)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).
Breshears et al., "Partial Hydrogen Injection Into Internal Combustion Engines", Proceedings of the EPA 1st Symposium on Low Pollution Power Systems and Development, Ann Arbor, MI, pp. 268–277 (Oct. 1973).
Chuvelliov et al., "Comparison of Alternative Energy Technologies Utilizing Fossil Fuels and Hydrogen Based on Their Damage to Population and Environment in the USSR and East Europe", pp. 269–300.

(List continued on next page.)

*Primary Examiner*—Erick R. Solis
*Attorney, Agent, or Firm*—Choate, Hall & Stewart

[57] ABSTRACT

Systems for producing hydrogen-rich gases including rapid response plasma fuel converters are provided. The rapid response plasma fuel converters systems are suitable for use in vehicles and the like in which the systems are capable of instantaneously providing hydrogen-rich gas, reducing pollutants during vehicle startup and allowing use of hydrogen-rich gas during load changes. The systems are preferably capable of responding on the order of a second or less. The systems include a plasma fuel converter for receiving hydrocarbon fuel and reforming the hydrocarbon fuel into a hydrogen-rich gas, an internal combustion engine adapted to receive the hydrogen-rich gas from the plasma fuel converter, a generator powered by the engine and connected to deliver electrical energy to power the plasma fuel converter, and a power supply circuit capable of rapidly providing power to the plasma fuel converter in response to a stimulus. The stimulus can be movement in the accelerator pedal controlled by the driver of the vehicle. The plasma fuel converters can be operated pulsed or non-pulsed modes of operation and can utilize arc or high frequency discharges. The plasma fuel converter can be either separated from the engine or directly integrated into the engine to allow for more efficient use of the thermal energy produced by the plasma fuel converter.

31 Claims, 7 Drawing Sheets

FOREIGN PATENT DOCUMENTS

| | | |
|---|---|---|
| 1519762 | 11/1989 | U.S.S.R. . |
| 1 221 317 | 2/1971 | United Kingdom . |
| 2 241 746 | 9/1991 | United Kingdom . |
| WO 85/00159 | 1/1985 | WIPO . |

OTHER PUBLICATIONS

Correa, "Lean Premixed Combustion For Gas–Turbines: Review and Required Research", PD–vol. 33, Fossile Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydorgen–Operated Engine System: Nature of Pollutants And Their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Saftey, Environmental Implants and Costs", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive For Road Vehicles—Results From Fleet Test Run In Berlin", Int. J. Hydrogen Energy, vol. 13, No. 4, pp. 243–250 (1988).

Finegold et al., "Dissociated Methanol As A Consumable Hydride For Automobiles And Gas Turbines", pp. 1359–1369, Advanceds in Hydrogen Energy 3 (Jun. 13–17, 1982).

Hall et al., "Initial Studies of as New Type of Ignitor: The Railplug"—SAE Paper 912319, pp. 1730–1746 (1991).

Houseman et al., "Hydrogen Engines Based On Liquid Fuels, A Review", G.E., Proc. 3rd World Hydrogen Energy Conf., pp. 949–968 (1980).

Houseman et al., "Two Stage Combustion for Low Emissions Without Catalytic Converters", Proc. of Automobile Engineering Meeting, Dearborn, MI, pp. 1–9 (Oct. 18–22, 1976).

Jones et al., "Exhaust Gas Reforming of Hydrocarbon Fuels, Soc. of Automotive Engineers", Paper 931086, pp. 223–234 (1993).

Kaske et al., "Hydrogen Production by the Hüls Plasma—Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development Of A 24 kW Gas Turbine–Driven Generator Set For Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Future Analysis of Railplugs as a New Type of Ignitor", SAE Paper 922167, pp. 1851–1862 (1992).

Mischenko et al., "Hydrogen As A Fuel For Road Vehicles", Proc. VII World Hydrogen Energy Conference, vol. 3, pp. 2037–2056 (1988).

Monroe et al., "Evaluation of a Cu/Zeolite Catalyst to Remove $NO_X$ from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Rabinovich et al., "Plasmatron Internal Combustion Engine System for Vehicle Pollution Reduction, Int. J. of Vehicle", Design, vol. 15, Nos. 3/4/5, pp. 234–242 (1994).

Scott et al., "Hydrogen Fuel Breakthrough With On–Demand Gas Generator", 372 Automotive Engineering, 93, No. 8, Warrendal, PA, U.S.A, pp. 81–84 (Aug. 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progess V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Fuel and Air Control for Rapid Response
Plasma Fuel Convertor

IG - High Frequency Ignitor for PT
PT - Plasmatron
VR - Voltage Regulator
IR - Current Regulator Power Control Circuit for Continuous Arc
Plasma Fuel Convertor Pulsed Plasmatron - Engine Electrical System PN - Pulse Network
FAV - Fast Acting Value
MC - Master Control

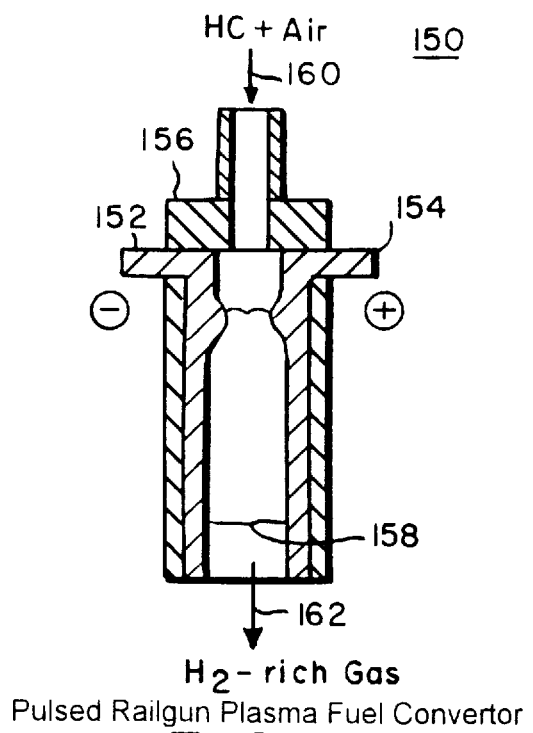
FIG. 4 Pulsed Railgun Plasma Fuel Convertor
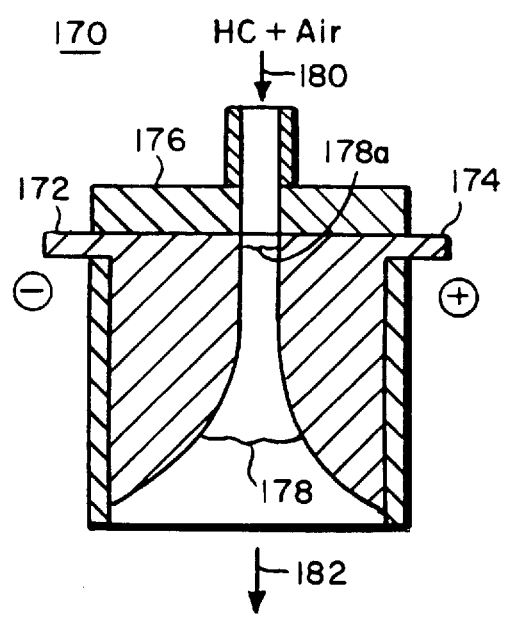
FIG. 5 Pulsed Gliding Discharge Fuel Convertor
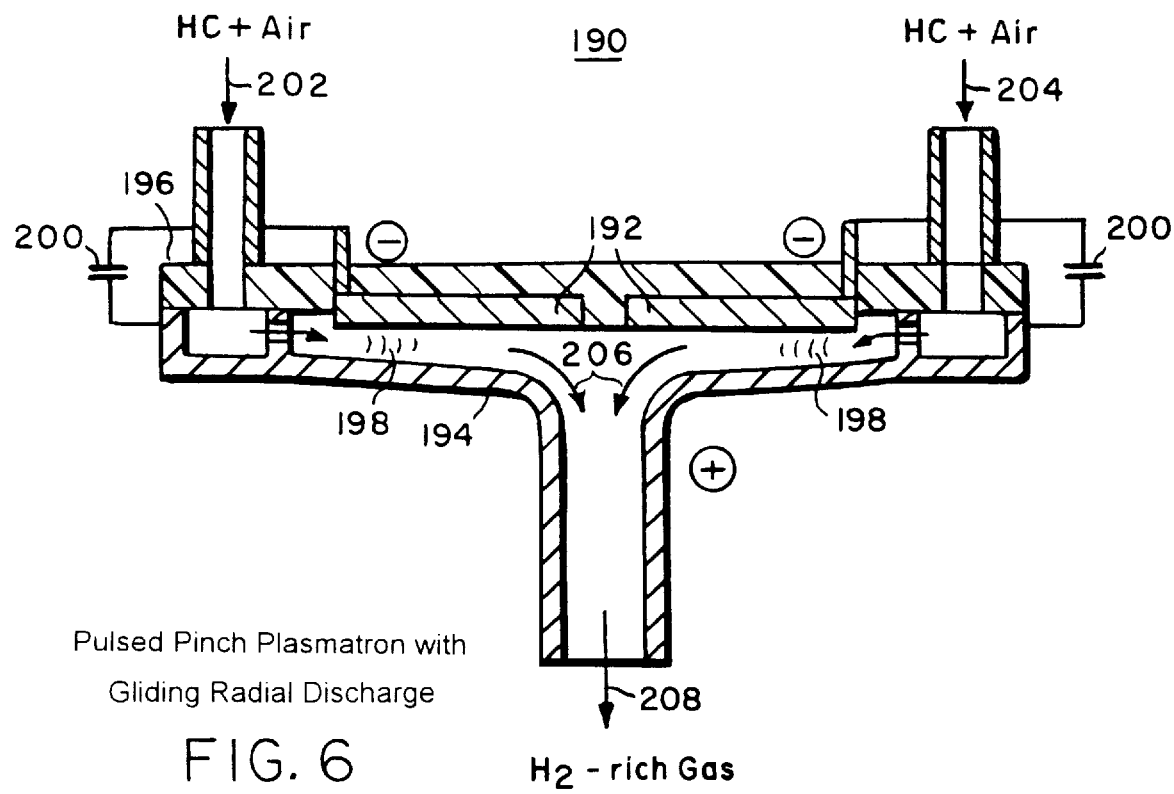
FIG. 6 Pulsed Pinch Plasmatron with Gliding Radial Discharge Pulsed Gliding Discharge Option for Integrated Plasmatron Hydrogen - Rich Gas Generation - Engine System Pulsed Plasmatron - Cylinder System for
Hydrogen - Rich Gas and Electricity Production Hybrid Plasma Fuel Convertor - Catalytic (Thermal) Partial Oxidation Reformer

RAPID RESPONSE PLASMA FUEL CONVERTER SYSTEMS

TECHNICAL FIELD

The present invention generally relates to systems including rapid response plasma fuel converters for supplying hydrogen-rich gas to internal combustion engines. The invention more particularly relates to systems including rapid response plasmatrons suitable for use in vehicles and the like in which the systems are capable of instantaneously providing hydrogen-rich gas, reducing pollutants during vehicle startup and allowing use of hydrogen-rich gas during load changes.

BACKGROUND OF THE INVENTION

Hydrogen is attractive as a fuel or additive for internal combustion engines because hydrogen as a fuel source can significantly reduce air pollution and can also serve as an alternative energy source to gasoline. See Mishchenko, et al., Proc. VII World Hydrogen Energy Conference, Vol. 3 (1988), Belogub, et al., Int. J. Hydrogen Energy, Vol. 16, 423 (1991), Varde, et al., Hydrogen Energy Progress V, Vol. 4 (1984), Feucht, et al., Int. J. Hydrogen Energy, Vol 13, 243 (1988), Chuveliov, et al., *In: Hydrogen Energy and Power Generation*, T. Nejat Veziroglu, Ed., Nova Science Publisher, New York, N.Y. (1991), Das, Int. J. Hydrogen Energy, Vol 16, 765 (1991). Moreover, engine efficiency can be 10–50% higher when running on hydrogen as compared with a gasoline engine. Prior art systems contemplated either storing hydrogen on-board or generating it on board. On-board storage requires high pressure vessels, cryogenic containers if the hydrogen is to be stored as a compressed gas or liquid, or large getter volumes and weights if the hydrogen is to be stored as a hydride. Moreover, the refill time for hydrogen is substantially longer than that for gasoline when the hydrogen is to be stored on-board.

As to the on-board production of hydrogen, several approaches have been disclosed in the prior art. For example, U.S. Pat. No. 5,143,025 to Munday discloses the use of electrolysis to separate water into hydrogen and oxygen and introducing the hydrogen into an internal combustion engine. In U.S. Pat. No. 5,159,900 to Dammann, hydrogen gas is produced by water interaction with solid carbon. Electrical current is passed between the carbon electrodes causing the electrodes to burn and oxidize to form carbon monoxide and hydrogen. U.S. Pat. No. 5,207,185 to Greiner et al. discloses a burner which utilizes a portion of the hydrocarbon fuel to reform another portion to produce hydrogen. The hydrogen is then mixed with the hydrocarbon fuel for introduction into an internal combustion engine.

Another system diverts a fraction of the gasoline from the flow path to the engine and is passed through a thermal converter and steam reformed to yield hydrogen-rich gas. See, Breshears, et al., *Proc. of EPA 1st Symposium on Low Pollution Power Systems Development*, 268 (1973). We note that the authors state that this system would not be practical to generate hydrogen as the sole fuel for an engine. Yet another system of this type uses partial oxidation in a catalytic converter to produce hydrogen rich gas. See Houseman, et al., Proc. 3rd World Hydrogen Energy Conf., 949 (1980). This system requires carefully controlled catalytic action and temperature range and has limitations for startup and transient response.

U.S. Pat. Nos. 5,425,332 and 5,437,250, both to Rabinovich et al., disclose plasmatron-internal combustion engine systems. The systems disclosed include a source of hydrocarbon fuel which is supplied to a plasmatron which reforms the fuel into a hydrogen-rich gas. Plasmatrons heat an electrically conducting gas either by an arc discharge or by a high frequency inductive or microwave discharge. An internal combustion engine is connected to receive the hydrogen-rich gas from the plasmatron. While these systems are significant improvements over the prior art, it would be desirable to provide systems that are capable of rapid response for instantaneously providing hydrogen-rich gas, reducing pollutants during startup and allowing use of hydrogen-rich gas during typical load changes. The entire contents of both U.S. Pat. Nos. 5,425,332 and 5,437,250 are incorporated herein by reference.

SUMMARY OF THE INVENTION

It is an object of the present invention to provide systems for producing hydrogen-rich gas that utilize plasma fuel converters capable of rapid response.

It is another object of the invention to provide rapid response systems capable of generating hydrogen-rich gas on the order of a second or less.

It is another object of the invention to provide systems for generating hydrogen-rich gas that reduce vehicle emission pollutants during startup or regular operation.

It is a further object of the invention to provide systems for generating and utilizing hydrogen-rich gas during load changes.

It is another object of the invention to provide systems for generating hydrogen-rich gas in which the power for processing the fuel source in the plasma fuel converter can be rapidly varied according to the flow rate to satisfy engine load requirements.

It is yet another object of the invention to provide rapid response systems for generating hydrogen-rich gas in which the power for processing the fuel in a continuous arc plasmatron is varied by optimal variation of both arc plasma voltage and current.

It is a further object of the invention to provide rapid response systems for producing hydrogen-rich gas which include a plasmatron capable of pulsed or non-pulsed modes of operation.

It is a further object of the invention to integrate the plasma fuel converter with the engine in order to make more efficient use of the thermal energy of the plasma fuel converter produced hydrogen-rich gas.

These and other objects of the invention are provided by rapid response systems that include a plasma fuel converter for receiving hydrocarbon fuel and reforming the hydrocarbon fuel into a hydrogen-rich gas, an internal combustion engine connected to receive the hydrogen-rich gas from the plasma fuel converter, a generator powered by the internal combustion engine and connected to deliver electrical energy to power the plasma fuel converter, and a power supply circuit capable of rapidly providing power to the plasma fuel converter in response to a stimulus. The systems provided by the present invention can be implemented in vehicles such that the stimulus controlling the power supply circuit is a change in the accelerator pedal of the vehicle, which is controlled by the driver of the vehicle. Master control systems and fast action valves can be utilized to control the introduction of air and fuel into the plasma fuel converter.

The power supply circuit includes a transformer connected to the generator, a battery connected to the generator, and an ignition system electrically connected to the battery and capable of initiating arc discharges in the plasma fuel converter and delivering power to the internal combustion engine. The transformer preferably includes a plurality of saturable toroidal reactors capable of controlling current electrically connected thereto and the generator preferably delivers three-phase AC current to the transformer. A rectifier is connected to the plasma fuel converter and to the transformer such that DC current is supplied to the plasma fuel converter. The systems also preferably include an ignition system and pulse network (PN).

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which:

FIG. 4 is a cross-sectional view of a pulsed railgun plasma fuel converter;

FIG. 5 is a cross-sectional view of a pulsed gliding discharge fuel converter;

FIG. 6 is a cross-sectional view of a pulsed pinch plasmatron with gliding radial discharge;

Similar reference characters refer to similar parts throughout the several views of the drawings.

DETAILED DESCRIPTION OF THE PREFERRED EMBODIMENTS

Figure 1:
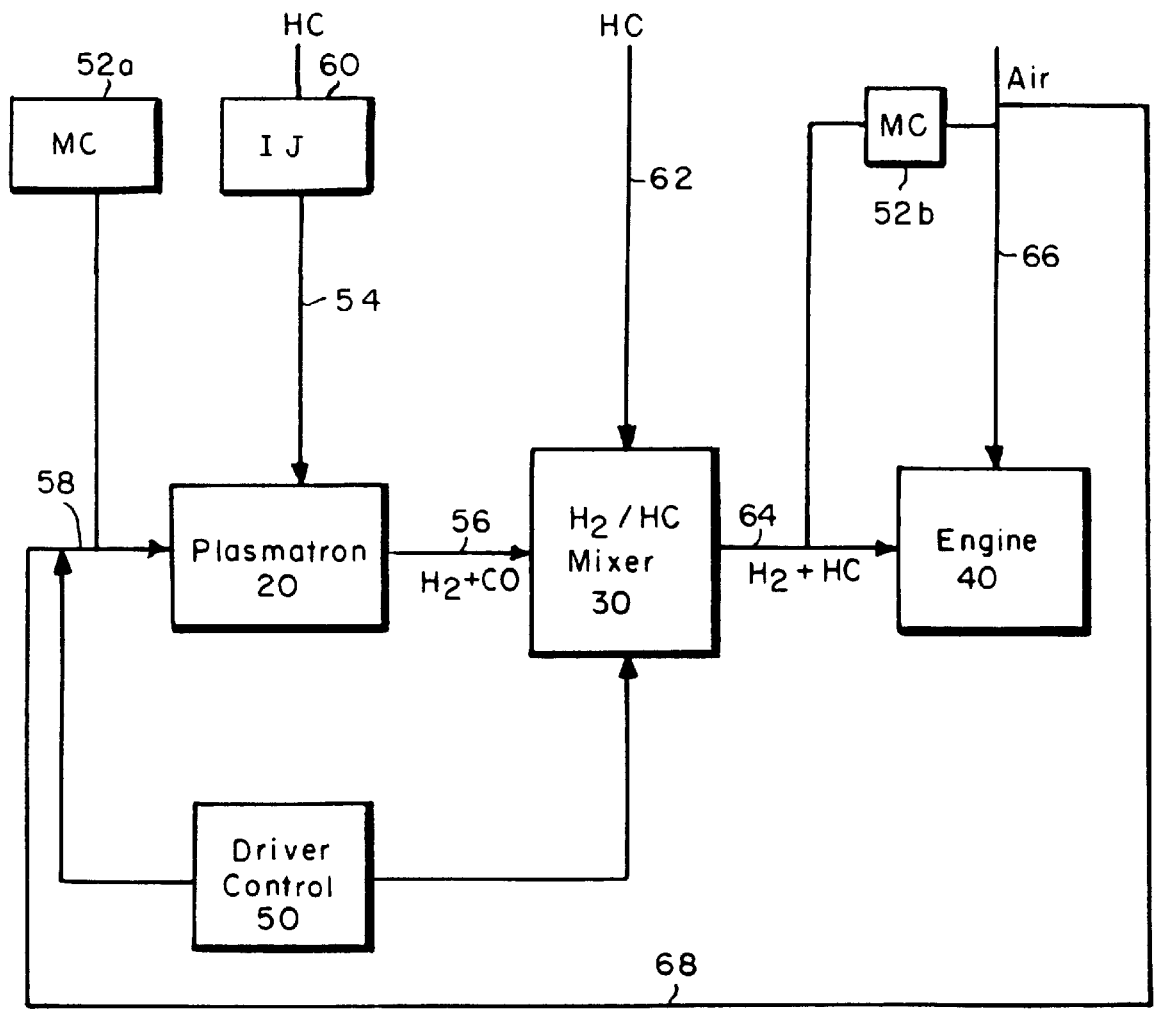
FIG. 1 is a block diagram illustrating a system for fuel and air control for a rapid response plasma fuel converter in accordance with the present invention.

As discussed in U.S. Pat. Nos. 5,425,332 and 5,437,250, plasma devices can provide an effective means for onboard conversion of gasoline and other fuels into hydrogen-rich gas (hydrogen and carbon monoxide) for use in vehicular internal combustion engines and for other applications. Use of hydrogen-rich gas in mixtures with gasoline produces a faster flame front which makes it possible to greatly reduce the amount of fuel in the cylinder charge. In such lean operation the charge temperature is significantly reduced, thereby greatly decreasing the production of nitrogen oxides ($NO_x$). Carbon monoxide and hydrocarbon emissions can also be significantly reduced. In addition to gasoline, other fuel sources for conversion into hydrogen-rich gas include: diesel, oil, heating oil, methanol, ethanol, and natural gas. In order to further reduce pollutants, it is desirable to provide a plasmatron that is capable of rapid response such that hydrogen-rich gas can be instantaneously provided, pollutants during vehicle startup can be reduced and hydrogen-rich gas can be used during load changes.

In one embodiment of the invention, the plasmatron is used in a partial oxidation reforming mode rather than as a steam reformer plasmatron. In the partial oxidation mode, the plasmatron is employed to provide the optimal temperature for a rich mixture of hydrocarbon fuel and air. While steam reforming could be a useful option for some applications, partial oxidation reformation minimizes electrical power requirements and can greatly reduce or eliminate the need for water (in contrast to steam reforming). The partial oxidation reaction between hydrocarbon fuel and air is exothermic and produces hydrogen, carbon monoxide and nitrogen. The reaction in a partial oxidation plasmatron is set forth in Equation (1) as follows:

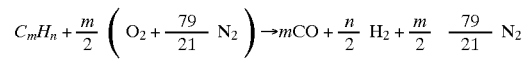

where m and n are the numbers of carbon and hydrogen atoms in a hydrocarbon molecule (e.g., m≈8 and n≈15 for gasoline). As used herein, "hydrogen-rich gas" refers to a gas containing hydrogen and carbon monoxide. In situations where the partial oxidation reaction of the hydrocarbon fuel is with air, "hydrogen-rich gas" can also include $N_2$. Production of $NO_x$ in the plasma fuel converter is extremely low because of the highly reducing atmosphere.

As stated above, it is desirable to develop special plasma fuel converters capable of rapid response such that the potential advantages for practical implementation in vehicles can be fully realized. Rapid response plasma fuel converters are needed to instantaneously provide hydrogen-rich gas, reduce engine pollutants during start-up and to allow for use of hydrogen-rich gas during load changes. As used herein, "rapid response" refers to plasma fuel converters capable of responding and generating hydrogen-rich gas on the order of a second or less. The present invention also provides rapid response plasma fuel converters that are capable of either steady state or pulsed modes of operation for the plasma fuel converters.

Referring now to FIG. 1, a system 10 for fuel and air control for a rapid response plasma fuel converter in accordance with the present invention is shown. The plasma fuel converter could be an AC or arc DC plasmatron or a high frequency plasmatron using inductive or microwave heating. The plasma fuel converter could be operated in either a continuous or pulsed mode of operation. System 10 includes plasmatron 20, engine 40, and $H_2$/hydrocarbon fuel mixer 30 which can provide variable mixtures 64 of hydrogen-rich gas and hydrocarbon fuel. System 10 also includes fuel pump and injector 60 and master automatic control units 52a and 52b which maintain the desired mixture of air and fuel in the plasma fuel converter and in the engine. Air sources 58 and 68 and hydrocarbon sources 54 and 62 are provided to system 10 as shown in FIG. 1.

In order for the plasmatron to rapidly respond, liquid fuels must be introduced into the plasma fuel converter rapidly and in a highly controlled manner. This can be accomplished utilizing fuel pump and fuel injector 60 as shown in FIG. 1. Air 66 and 68 can be introduced into system 10 using a compressor (not shown in FIG. 1). The rate of air introduction is determined by the engine power requirement. A portion of air flow 68 is fed to plasmatron as air flow 58. The air flow 58 is determined by the accelerator pedal controlled by the driver 50. The amount of fuel 54 introduced by the fuel injector 60 is controlled by the air flow 58 using master control 52a. The ratio of fuel to air introduced into plasmatron 20 is preferably designed to be very rich, i.e. it will be close to the stoichiometric ratio in Equation (1). Hydrogen-rich gas 56 containing hydrogen, carbon monoxide and nitrogen are thus produced in plasmatron 20.

For high engine loads, it may be desirable to provide hydrogen-rich gas to engine 40 by a small storage tank (not shown in FIG. 1) in addition to providing the gas directly from the plasma fuel converter. In some situations, where the highest engine power levels are required, it may be desirable to utilize 100% gasoline operation (fuel 62) with stoichiometric fuel to air mixtures for brief periods of acceleration; this mode of operation increases cylinder volumetric power efficiency and reduces plasma fuel converter electrical power requirements for a given amount of engine power. This mode of operation would likely be used only for conditions of highest power level. As further shown in FIG. 1, hydrogen-rich gas flow 56 can be combined with hydrocarbon fuel source 62 in different ratios by using mixer 30. Plow 64 of hydrogen-rich gas, hydrocarbon fuel or combinations thereof is controlled by master control 52b, which is determined by air flow 66 and engine load requirements. The driver could manually change the ratio between the hydrogen-rich gas and gasoline depending on driving conditions.

Figure 2:
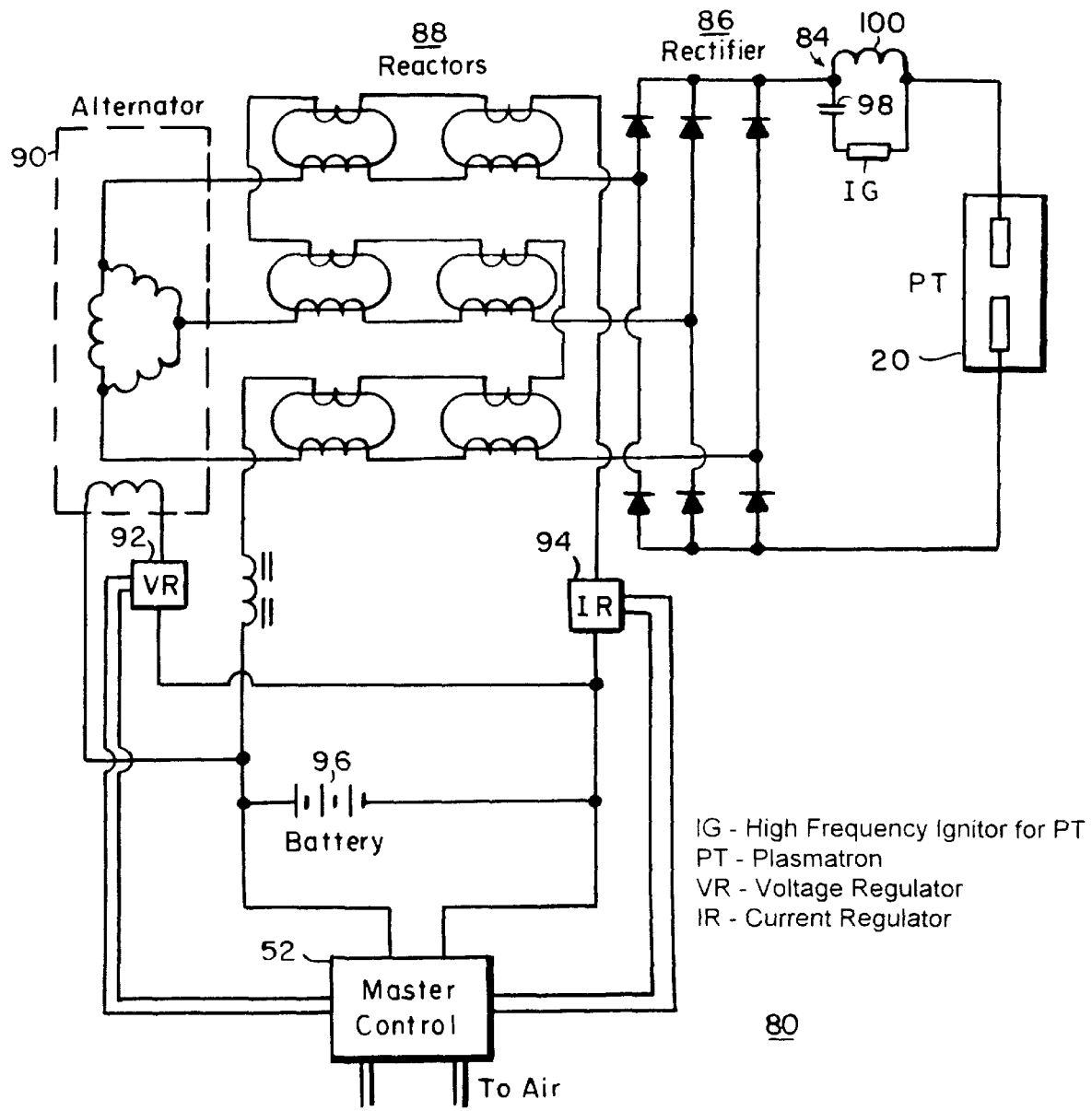
FIG. 2 illustrates a power control circuit for a continuous arc plasma fuel converter according to the invention.

FIG. 2 illustrates a rapid power control circuit 80 for a continuous arc plasmatron according to the present invention. The power for processing the fuel in the plasma fuel converter must be capable of being rapidly varied according to the flow rate to meet engine load requirements. In a continuous arc plasmatron, the power is changed by optimal variation of both arc plasma voltage and current. The circuit shown in FIG. 2 allows for the control of current and voltage.

The arc plasma in plasmatron 20 is operated with DC current in order to facilitate stable operation and allow for substantial variation in arc length and voltage. If current is maintained at a constant level and gas flowrate is increased, the arc resistivity and voltage increases, thereby adding power without increasing current and consequently reducing electrode erosion. AC current is used in the first part of the circuit to allow for rapid adjustment of current. The diode circuit in FIG. 2 changes the current from AC to DC for operation of the arc plasma.

As the demand for more power occurs, both voltage and current will increase. The voltage and current control is used to provide the required amount of power. Current control is achieved by the use of saturable toroidal reactors 88, which is possible with AC current input to the diode rectifier.

The controlled DC power for the plasmatron may also be obtained by a controlled rectifier system in place of the saturable reactor-diode rectifier system.

Circuit 80 also includes a high voltage ignitor circuit 84 to start the arc plasma discharge. The circuit utilizes a capacitor 98 and inductor 100 to provide a voltage of about 20 kilovolts to ignite a DC arc in the plasmatron.

The voltage/current ratio may be varied for performance optimization. This can be accomplished with voltage regulator 92, current regulator 94, both of which are connected to battery 96 and master control 52. As discussed herein, alternator 90, which is also connected to master control 52, provides three phase AC current to the transformer and charges battery 96.

In certain situations, it may be desirable to utilize rapid power control in conjunction with pulsed plasmatron generation of hydrogen-rich gas. Pulsed plasmatron operation would be optimized for the required power gas flow by changing the repetition rate of pulses at the same power per pulse of the plasmatron.

Figure 3:
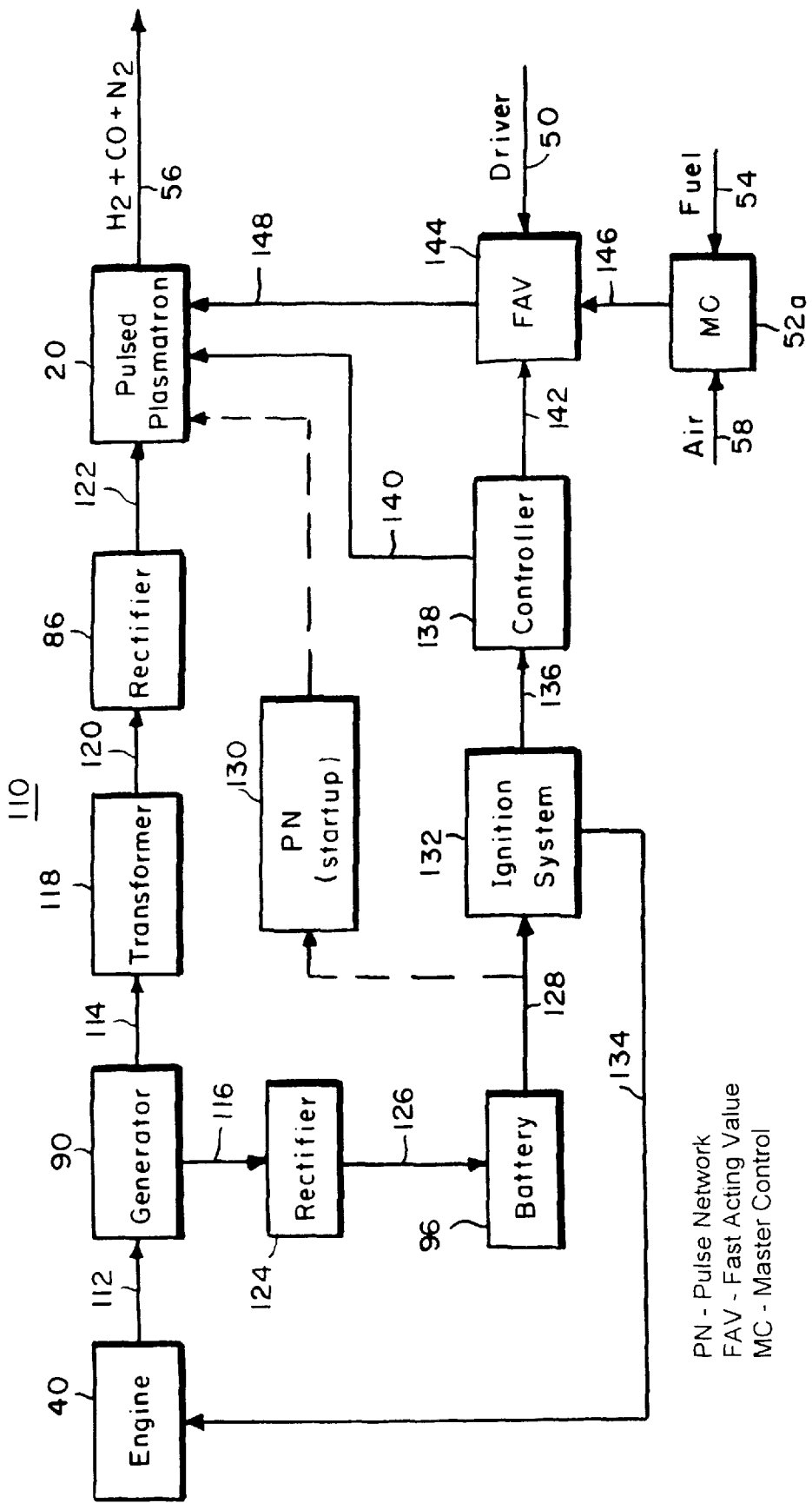
FIG. 3 is a block diagram showing a pulsed plasmatron-engine electrical system.

The pulsed plasmatron-internal combustion engine system could operate with a unique circuit to allow variation of repetition rate in accordance with engine power demand. This circuit is designed to be compatible with a vehicular electrical system. An exemplary pulsed plasmatron-engine electrical system suitable for use in the present invention is illustrated in FIG. 3.

System 110 includes engine 40 that produces mechanical energy 112 to power generator 90. The generator 90 delivers three phase AC current to transformer 118 and charges battery 96 by electrical energy through circuits 114 and 116. Transformer 118 increases the AC voltage which is supplied to the rectifier 86. Rectifier 86 in turn supplies DC power 122 to the arc of the pulsed plasmatron 20. As mentioned above, the generator 90 also is capable of providing electrical energy 126 to charge the battery 96 using rectifier 124. The battery 96 can be used to supply energy 128 to the spark ignition system 132 and for the pulse network (PN) 130 for initial startup of the plasmatron 20.

During engine operation, DC power will be always connected to the pulsed plasmatron 20. As further shown in FIG. 3, the high voltage and high frequency spark ignition system 132 delivers power 136 to controller 138 to ignite discharge 140 in the plasmatron 20. Controller 138 simultaneously will open the solenoid valve in the fast acting valve (FAV) 144 via 142 to send a portion of the air 58 and fuel 54 to plasmatron 20 via 148. Air 58 and fuel 54 are fed to plasmatron 20 as a mixture 146 that is controlled by master control 52a. The fuel injection system already existing in the vehicle could be used as a FAV. As discussed above in connection with FIG. 1, the rate of air introduction 58 is determined by the engine power requirement and the amount of fuel 54 is determined by the air flow 58. The engine power requirement for air flow 58 is determined by the accelerator pedal controlled by the driver in the vehicle 50 and master control 52a is connected to the accelerator pedal. The width of the pulse of such a system is about 1.5–10 ms. The plasmatron will produce a pulse of plasma gas 56 which will be delivered to the engine 40. Alternatively, hydrogen-rich gas can be introduced into a storage tank for later use in the engine. In either embodiment, hydrogen-rich gas 56 can be combined with other fuel (such as hydrocarbon fuel 62 shown in FIG. 1).

During initial start-up, the plasmatron will be started utilizing electrical energy 128 from the battery 96 supplied to the PN 130 and ignition system 132. The PN is a combination of several stages of capacitors and inductors.

Several types of pulsed plasma fuel converters and systems arrangements for use in accordance with the present invention will now be discussed. These plasma fuel converters and system arrangements are exemplary and are not to be construed as limiting. Three types of plasma fuel converters that do not require water cooling are illustrated in FIGS. 4–6. The plasma fuel converters will provide uniform discharge with high average power. The advantages of the uniform pulsed plasma fuel converters include high plasma fuel converter thermal efficiency (no water cooling) and long lifetime because of shorter contact time of the electrodes with the plasma arc roots. The plasma fuel converters shown in FIGS. 4–5 have been developed previously for other applications. See, Hall et al., *Initial Studies of a New Type* of Ignitor: The Railplug*, SAE Paper 912319 (1991); Czernichowski et al., *Multi-Electrodes High Pressure Gliding Discharge Reactor and Its Applications for Some Waste Gas and Vapor Incineration*, Proceedings of Workshop on Plasma Destruction of Wastes, France (1990). However, these plasma fuel converters have not been used for hydrogen-rich gas generation in a vehicle. Nor have such plasma fuel converters been utilized in systems capable of rapid response. Each of these types of plasma fuel converters must accordingly be modified for use in the present invention.

In a rail-gun type of a plasma fuel converter 150 as shown in FIG. 4, a cathode 152 is electrically insulated from the anode 154 by insulator 156. A mixture of hydrocarbon fuel and air 160 is introduced into plasma fuel converter 150 as further illustrated in FIG. 4. Alternatively, hydrocarbon fuel and air can be introduced separately and combined in the plasma fuel converter. The plasma arc 158 sweeps axially between the two parallel electrodes 152 and 154 and reformed hydrogen-rich gas 162 exits the plasma fuel converter. The acceleration is mainly provided by the interaction of the arc current with the self-magnetic field and by gas flow. The rail-gun plasma fuel converter will be modified to operate at an order of magnitude larger size than previous designs (Hall et al., *Initial Studies of a New Type of Ignitor: The Railplug*, SAE Paper 912319 (1991)) and to provide conversion of hydrocarbon fuel. The rail-gun plasma fuel converter further will be modified from the previous designs by using pulsed fuel and air injection coordinated with pulsed power as discussed previously in connection with FIGS. 1–3 such that the plasma fuel converter is capable of rapidly responding to engine load requirements and instantaneously providing hydrogen-rich gas.

Referring now to FIG. 5, a gliding discharge plasma fuel converter is shown. Plasma fuel converter 170 includes cathode 172 electrically insulated from anode 174 by insulator 176. A mixture of hydrocarbon fuel and air 180 is introduced into plasma fuel converter 170. In an alternative embodiment, hydrocarbon fuel and air can be introduced separately and combined in the plasma fuel converter. The arc discharges 178 are initiated at the spot where the distance between the diverging electrodes is the shortest (e.g., 178a) and progressively spread along the electrodes in the direction of the reagent's flow until they disappear by themselves after a certain path (Czernichowski et al., *Multi-Electrodes High Pressure Gliding Discharge Reactor and Its Applications for Some Waste Gas and Vapor Incineration*, Proceedings of Workshop on Plasma Destruction of Wastes, France (1990)). This path is defined by the geometry of the electrodes, by the conditions of flow, and by the characteristics of the power supplies. The gliding discharge plasma fuel converter will be modified from the previous designs by using pulsed fuel and air injection coordinated with pulsed power as discussed previously in connection with FIGS. 1–3 such that the plasma fuel converter is capable of rapidly responding to engine load requirements and instantaneously providing hydrogen-rich gas.

The radial gliding pulsed plasmatron shown in FIG. 6 is a modification of a gliding discharge plasmatron such as that shown in FIG. 5. Plasmatron 190 includes a plurality of cathodes 192 electrically insulated from anode 194 by insulator 196. Mixtures of hydrocarbon fuel and air 202, 204 are introduced into plasmatron 190 as shown in FIG. 6. Discharges 198 will be simultaneously ignited between the anode 194 and several radial cathodes 192 at the shortest distance and will glide toward the center in the direction of arrows 206 under the influence of the gas flow, thereby producing hydrogen-rich gas 208. As a result, the lifetime of the electrodes would be very high and the material would not be limited to thermoconductive copper.

The rate of conversion of the hydrocarbon fuel would be higher because of the increased residence time. The radial gliding discharge plasmatron will be modified from the previous designs by using pulsed fuel and air injection coordinated with pulsed power as discussed previously in connection with FIGS. 1–3 such that the plasmatron is capable of rapidly responding to engine load requirements and instantaneously providing hydrogen-rich gas.

Figure 7:
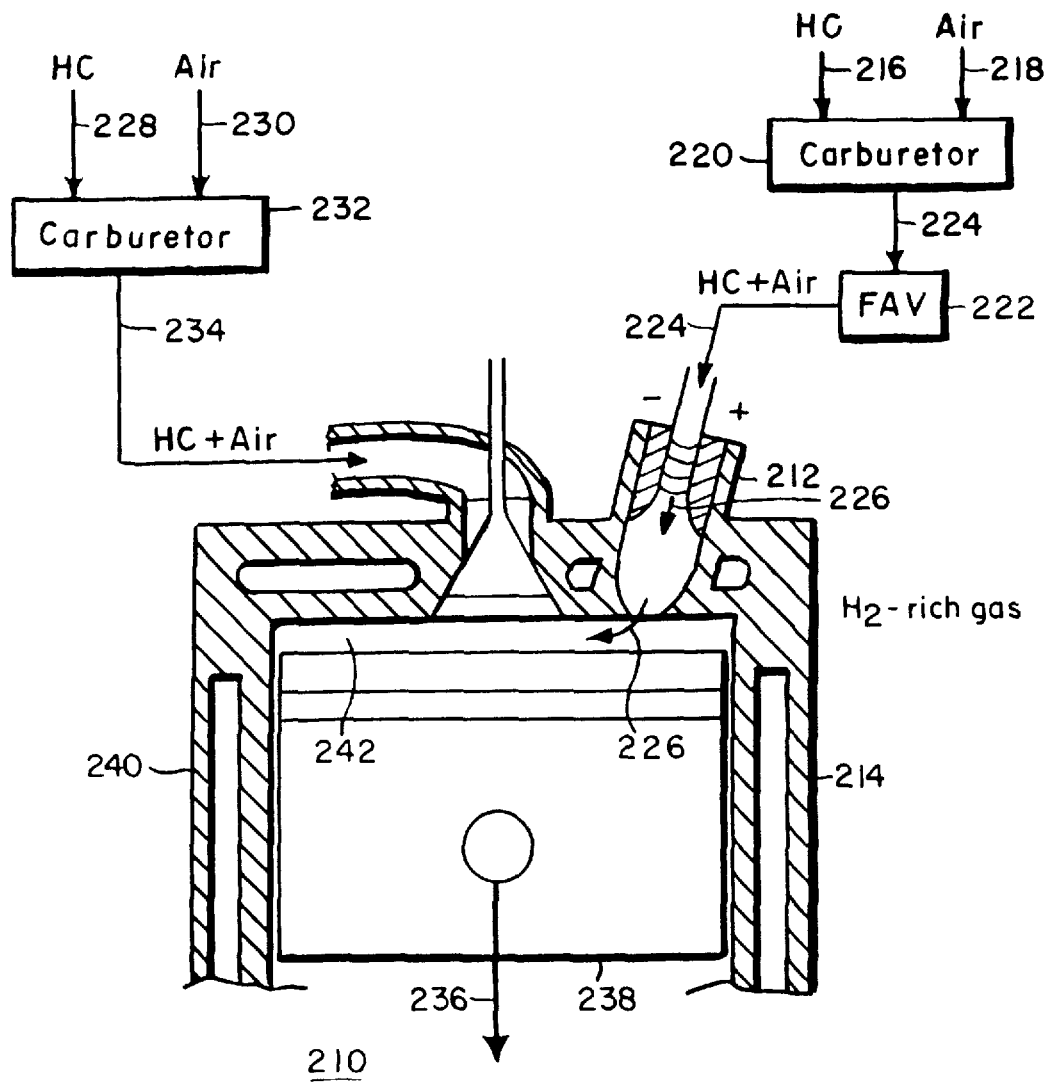
FIG. 7 is a cross-sectional view of a pulsed gliding discharge for an integrated plasmatron hydrogen-rich gas generation-engine system according to an embodiment of the present invention.

In another embodiment of the invention, the pulsed plasmatron for hydrogen-rich gas production could be integrated with the cylinders of an engine. In this way, the energy released by the partial oxidation can be used in the engine. An exemplary pulsed gliding discharge option for an integrated plasmatron hydrogen-rich gas production-engine system is illustrated in FIG. 7. System 210 includes plasmatron 212 connected to engine 214. The operation of the integrated system is similar to a plasma-jet ignition engine. A main carburetor and intake manifold 232 controls the quantities of hydrocarbon fuel 228 and air 230 such that the desired hydrocarbon fuel-air mixture 234 fed to the combustion chamber 242 of engine 214 is properly proportioned. A separate carburetor and intake manifold 220 feeds a fuel-rich mixture of fuel and air 224 into plasmatron 212 using a fast acting valve (FAV) 222. Carburetor 220 controls the quantities of hydrocarbon fuel 216 and air 218 such that hydrocarbon fuel-air mixture 224 introduced into plasmatron 212 via fast action valve 222 is properly proportioned.

After the lean mixture 234 is compressed in combustion chamber 242, the solenoid controlled FAV 222 sends a portion of the rich fuel-air mixture 224 into the plasmatron 212. Plasmatron 212 produces and injects a jet of hydrogen-rich gases 226 into the combustion chamber 242, igniting the lean charge of mixture 234. The combustion process produces mechanical energy 236 by the piston 238 reciprocating in engine cylinder 240. For this configuration, the pulsed plasmatron must operate at gas densities that are significantly higher than atmospheric density. The studies of the railplug ignitor (Hall et al, *Initial Studies of a New Type of Ignitor: The Railplug*, SAE Paper 912319 (1991)) have shown that railplugs can produce a high velocity jet at a pressure of 200 psig.

Figure 8:
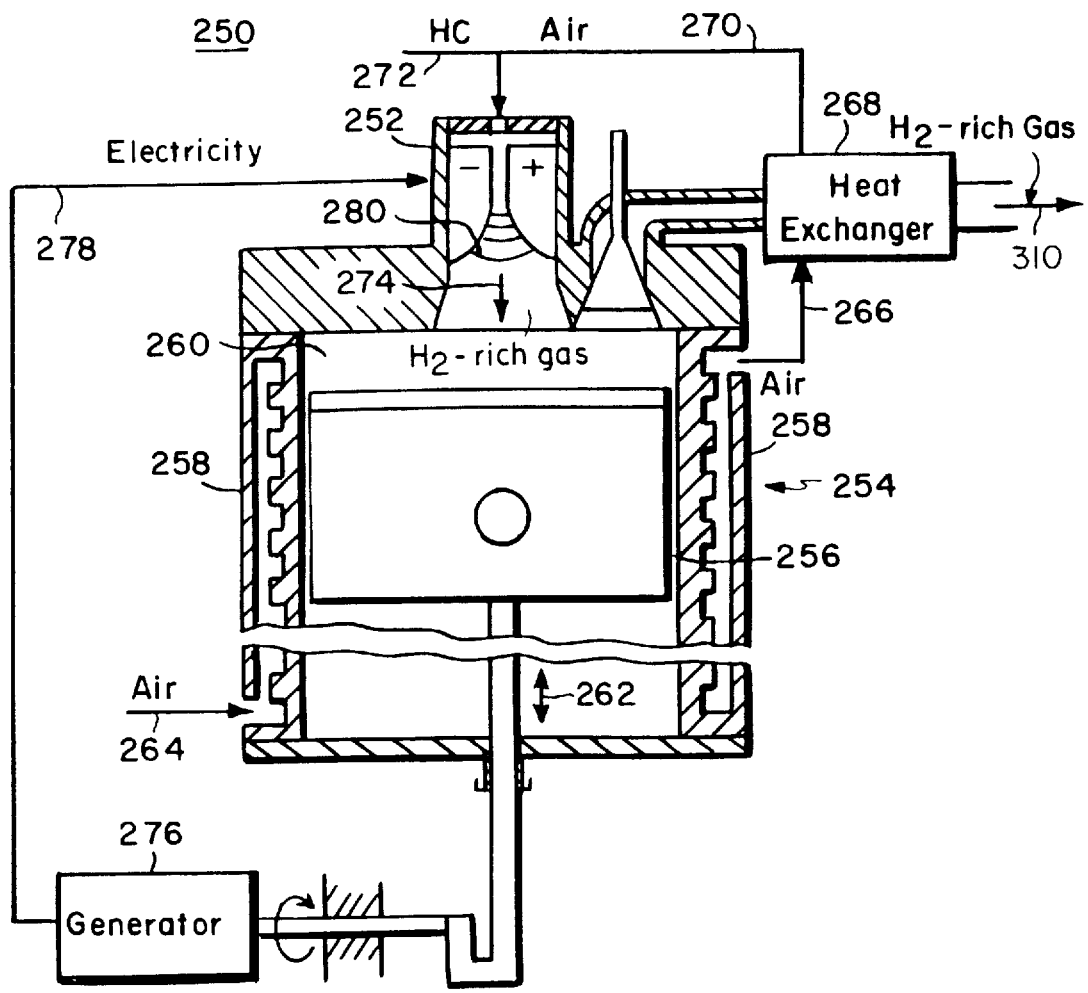
FIG. 8 is a cross-sectional view of a pulsed plasmatron-cylinder system for the production of hydrogen-rich gas and electricity.

In yet another embodiment of the invention, a pulsed plasmatron for hydrogen-rich gas production could be incorporated into the cylinder of an engine to provide a self-sustaining system such as that shown in FIG. 8. This one cylinder engine would be operated with a very rich mixture of hydrocarbon fuel and air and consequently would produce very little $NO_x$. During the partial oxidation reaction, about 17 percent of the low heating value of gasoline is released to the hydrogen-rich gas. In some situations, it is desirable to transform at least part of this heat energy to the mechanical energy of the piston motion and subsequently to the electrical energy supplied to the plasmatron. Another part of heat energy could be recovered by air incoming to the plasmatron. The air will take energy during regenerative cooling of the cylinder walls and then in the hydrogen-rich gas exhaust heat exchanger. In this manner, the energy of the partial oxidation reaction can be utilized in the system.

The system 250 illustrated in FIG. 8 includes plasmatron 252 and engine 254. Engine 254 includes cylinder wall 258 and piston 256. A generator 276 is connected to the shaft of piston 256.

Hydrocarbon fuel 272 is mixed with air 270 and is introduced into plasmatron 252. Alternatively, hydrocarbon fuel and air can be introduced into the plasmatron separately and combined within the plasmatron. The plasmatron illustrated in FIG. 8 is a gliding discharge plasmatron and thus arc discharges 280 are initiated at the location where the distance between the diverging electrode is the shortest. It will be appreciated by those skilled in the art that other plasmatrons can be utilized in the system shown in FIG. 8 and that such modifications are within the scope of the present invention. Hydrogen-rich gas 274 exits plasmatron 252 and is fed to the combustion chamber 260 of engine 254. A portion of the heat energy released reciprocates piston 256 in the directions of arrow 262. Mechanical energy produced by engine 254 powers generator 276, thereby producing electricity 278. At least a portion of electricity 278 can be utilized to power plasmatron 252, thereby producing a self-sustaining system.

Another part of heat energy could be recovered by air 270 incoming to the plasmatron 252. Air 264 will take energy during regenerative cooling of the cylinder walls 258 of the engine 254 and then as air 266 in the hydrogen-rich gas 274 exhaust heat exchanger 268. In order to prevent the leaking of hydrogen-rich gas to the atmosphere, the entire plasmatron-engine unit could be enclosed in a completely sealed shield (not shown in FIG. 8). Such a shield could be formed of ceramic or the like. As discussed herein, a portion of the incoming air could be injected through the seal in order to create positive pressure and prevent leaking. It will be appreciated by those skilled in the art that the system illustrated in FIG. 8 can readily be modified for other alternatives within the scope of the invention. For example and while not intending to be limiting, one variation can include the use of two or more cylinder units employed together.

In still another embodiment of the invention, it may be advantageous to use a conventional catalytic or thermal reformer in conjunction with the plasma fuel converter. The use of a catalytic reformer could further increase fuel efficiency. Houseman et al., *Hydrogen Engines Based on Liquid Fuels: A Review*, Proceedings Third World Hydrogen Energy Conference, p. 949 (1980). The plasma fuel converter could be used to provide immediate production of hydrogen-rich gas and to warm up the conventional reformer. The conventional reformer could then be employed to produce hydrogen-rich gas with greater efficiency than the plasma fuel converter since it does not require external power. The plasma reformer could then operate in parallel with the catalytic reformer to provide fast response and extra levels of hydrogen-rich gas for the engine.

In parallel operation, the conventional reformer preferably would be sized so that it only needs to provide hydrogen-rich gas at moderate flow level (e.g., on the order of twice the idle level). Because conventional reformer size and cost are significant factors, the resulting reduction of the conventional reformer size by a factor of five or more could be significant. Additionally, because operation of the conventional reformer is less of a power drain than the plasma device, it would be utilized where possible.

The plasma fuel converter and conventional reformer arrangement could also be employed and used in series; e.g., the conventional reformer could be warmed by hot gas and radiation from the plasma fuel converter and could provide additional processing of the gas from the plasma device.

Figure 9:
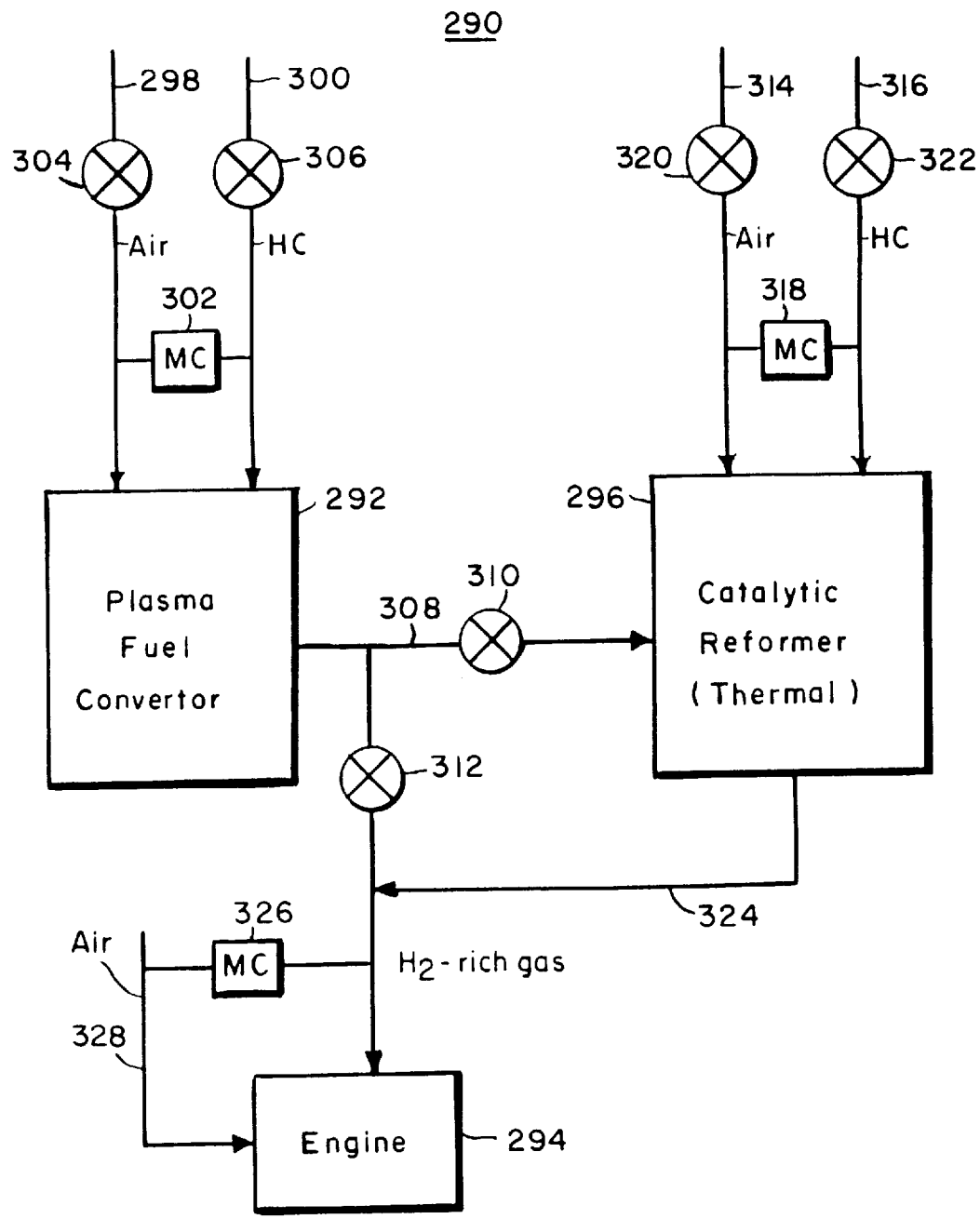
FIG. 9 is a block diagram illustrating a hybrid plasma fuel converter-catalytic partial oxidation reformer for use in the present invention.

FIG. 9 schematically shows an illustrative configuration for a hybrid plasma fuel converter-conventional reformer device. System 290 includes plasma fuel converter 292, engine 294 and catalytic reformer 296. Master control 302 and flow control valve 304 control the quantity of air 298 while master control 302 and flow control valve 306 control the quantity of hydrocarbon fuel 300 introduced into plasma fuel converter 292. Hydrogen-rich gas 308 exits plasma fuel converter 292 and is fed to catalytic reformer 296 and/or engine 294. Flow to a catalytic reformer 296 and engine 294 is regulated by flow control valves 310 and 312, respectively.

Master control 318 and flow control valve 320 regulate the flow of air 314 to catalytic reformer 296 while master control 318 and flow control valve 322 regulate the flow of hydrocarbon fuel 316 to catalytic reformer 296. Reformed gases 324 are fed to engine 294. As further shown in FIG. 9, reformed gases 324 can be combined with hydrogen-rich gases 308 prior to introduction in engine 294 in a predetermined manner utilizing flow control valve 312. The flow of gases 308 and/or 324 entering engine 294 is determined by the quantity of air 328 required for engine requirements and is controlled by master control 326.

During startup, hot hydrogen-rich gas and possibly radiation from the plasma fuel converter would pass through the catalytic reformer, thereby providing sufficient heat to a temperature where the catalytic reformer can effectively reform fuel. After the catalytic reformer is warmed up, the control system could switch fuel and air to it and the plasma fuel converter and catalytic converter system could run in series or in parallel.

As discussed in U.S. Pat. Nos. 5,425,332 and 5,437,250, the major contributor to air pollution in the U.S. is the fossil-fuel powered motor vehicle. In 1987, 66 percent of the carbon monoxide emission, 43 percent of $NO_x$, emissions, and 20 percent of particle emissions came from motor vehicles alone. The rapid response and pulsed operation capabilities of the plasma fuel converter and systems provided by the present invention could significantly aid in the improvement of air quality.

It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. A power system comprising:
    a plasma fuel converter for receiving hydrocarbon fuel and reforming the hydrocarbon fuel into a hydrogen-rich gas;
    an internal combustion engine adapted to receive the hydrogen-rich gas from the plasma fuel converter, the engine operating at a load condition;
    a generator powered by the engine and connected to deliver electrical energy to power the plasma fuel converter; and
    a power supply circuit configured to provide power with a controlled voltage/current ratio to the plasma fuel converter in response to a change in the load condition.

2. The power system of claim 1, wherein the system is configured to respond in about one second or less.

3. The power system of claim 1, wherein the plasma fuel converter utilizes an arc discharge or a high frequency discharge.

4. The power system of claim 3, wherein the high frequency discharge is provided by inductive or microwave heating.

5. The power system of claim 1, wherein the plasma fuel converter is an arc plasmatron.

6. The power system of claim 5, wherein the power supply circuit comprises:

a transformer connected to the generator;

a battery electrically connected to the generator; and an ignition system electrically connected to the battery and configured to initiate discharges in the plasmatron.

7. The power system of claim 6, further including a plurality of saturable toroidal reactors connected to the transformer and configured to control current.

8. The power system of claim 7, further including a rectifier electrically connected to plurality of saturable toroidal reactors and to the plasmatron.

9. The power system of claim 8, wherein the generator is configured to deliver three-phase AC current to the transformer and the rectifier is configured to supply DC current to the plasmatron.

10. The power system of claim 6, further including a controller and a fuel injector configured to maintain a predetermined mixture of the hydrocarbon fuel and the air introduced into the plasmatron in response to the change in the load condition.

11. The power system of claim 1, further including a controller and a fuel injector configured to maintain a predetermined mixture of the hydrocarbon fuel and the air introduced into the plasmatron in response to the change in the load condition.

12. The power system of claim 1, wherein the system is used in a vehicle and the change in the load condition is movement in an accelerator pedal in the vehicle.

13. The power system of claim 1, wherein the plasma fuel converter is a partial oxidation plasmatron.

14. The power system of claim 13, further including a controller and a fuel injector configured to maintain a predetermined mixture of the hydrocarbon fuel and the air introduced into the plasmatron in response to the change in the load condition.

15. The power system of claim 14, wherein the predetermined mixture of the hydrocarbon fuel and the air introduced into the plasmatron is about equal to a stoichiometric ratio of fuel to air.

16. The power system of claim 13, wherein the system is configured for a pulsed mode of operation.

17. The power system of claim 13, wherein the system is configured for pulsed and non-pulsed modes of operation.

18. The power system of claim 13, wherein the plasmatron is a pulsed railgun plasmatron.

19. The power system of claim 13, wherein the plasmatron is a pulsed gliding discharge fuel plasmatron.

20. The power system of claim 1, wherein the plasma fuel converter is a pulsed pinch plasmatron with gliding radial discharge.

21. The power system of claim 1 wherein the plasma fuel converter is integrated with the internal combustion engine.

22. The power system of claim 21, wherein the plasma fuel converter is a pulsed gliding discharge fuel plasmatron.

23. The power system of claim 22, further including a heat exchanger configured to preheat incoming air to the plasmatron.

24. The power system of claim 21, wherein the power supply circuit comprises:

a transformer connected to the generator;

a battery electrically connected to the generator; and an ignition system electrically connected to the battery and configured to initiate discharges in the plasma fuel converter.

25. The power system of claim 21, further including a first carburetor for controllably introducing a fuel and air into the combustion chamber of the internal combustion engine.

26. The power system of claim 25, further including a second carburetor for controllably introducing the hydrocarbon fuel and air into the plasma fuel converter.

27. The power system of claim 26, further including a fast action valve positioned between the second carburetor and the plasma fuel converter.

28. The power system of claim 21, wherein the plasma fuel converter is integrated with the internal combustion engine such that thermal energy in the hydrogen-rich gas can be used in the internal combustion engine.

29. The power system of claim 28, further including at least one heat exchanger configured to preheat incoming air to the plasma fuel converter.

30. The power system of claim 21, further including a heat exchanger configured to preheat incoming air to the plasma fuel converter.

31. The power system of claim 21, further including a catalytic or thermal fuel reformer connected to the plasma fuel converter and the internal combustion engine.

* * * * *